US012562423B2

(12) United States Patent
Park

(10) Patent No.: US 12,562,423 B2
(45) Date of Patent: Feb. 24, 2026

(54) SECONDARY BATTERY AND BATTERY PACK INCLUDING THE SAME

(71) Applicant: LG ENERGY SOLUTION, LTD., Seoul (KR)

(72) Inventor: Jeong Eon Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 561 days.

(21) Appl. No.: 17/781,548

(22) PCT Filed: Jan. 8, 2021

(86) PCT No.: PCT/KR2021/000278
§ 371 (c)(1),
(2) Date: Jun. 1, 2022

(87) PCT Pub. No.: WO2021/145613
PCT Pub. Date: Jul. 22, 2021

(65) Prior Publication Data
US 2022/0416341 A1 Dec. 29, 2022

(30) Foreign Application Priority Data
Jan. 17, 2020 (KR) ........................ 10-2020-0006802

(51) Int. Cl.
*H01M 50/198* (2021.01)
*H01M 10/04* (2006.01)
(Continued)

(52) U.S. Cl.
CPC ..... *H01M 50/198* (2021.01); *H01M 10/0422* (2013.01); *H01M 10/0431* (2013.01);
(Continued)

(58) Field of Classification Search
CPC ......... H01M 10/0422; H01M 10/0431; H01M 50/186; H01M 50/193; H01M 50/198; H01M 10/0587; H01M 2200/00; H01M 50/152; H01M 50/167; H01M 50/183; Y02E 60/10; Y02P 70/50
See application file for complete search history.

(56) References Cited

U.S. PATENT DOCUMENTS 7,709,141 B2 5/2010 Kim et al.
7,722,983 B2 5/2010 Kim et al.
(Continued)

FOREIGN PATENT DOCUMENTS

JP 11-199857 A 7/1999
JP 2001-351588 A 1/2001
(Continued)

OTHER PUBLICATIONS

International Search Report (PCT/ISA/210) issued in PCT/KR2021/000278, dated Apr. 29, 2021.

*Primary Examiner* — Lingwen R Zeng
(74) *Attorney, Agent, or Firm* — Birch, Stewart, Kolasch & Birch, LLP

(57) ABSTRACT

A secondary battery includes an electrode assembly, a battery case surrounding the electrode assembly, and a sealing member located between the electrode assembly and the battery case. The sealing member includes polymer particles that are configured to expand in all directions.

16 Claims, 4 Drawing Sheets

(51) Int. Cl.
    *H01M 50/186*     (2021.01)
    *H01M 50/193*     (2021.01)
    *H01M 10/0587*     (2010.01)
    *H01M 50/152*     (2021.01)
    *H01M 50/167*     (2021.01)
    *H01M 50/183*     (2021.01)

(52) U.S. Cl.
    CPC ....... *H01M 50/186* (2021.01); *H01M 50/193*
    (2021.01); *H01M 10/0587* (2013.01); *H01M*
    *50/152* (2021.01); *H01M 50/167* (2021.01);
    *H01M 50/183* (2021.01); *H01M 2200/00*
    (2013.01); *Y02E 60/10* (2013.01); *Y02P 70/50*
    (2015.11)

(56) References Cited

U.S. PATENT DOCUMENTS

2007/0154787 A1     7/2007   Jang et al.
2012/0115025 A1*   5/2012   Kim .................. H01M 10/0431
                                      429/186
2015/0307752 A1*   10/2015   Park .................. C08G 18/7671
                                      429/208
2016/0107009 A1*   4/2016   Cordani .................. A62C 3/16
                                      53/445
2019/0280263 A1     9/2019   Shin et al.

FOREIGN PATENT DOCUMENTS

| JP | 2007-184234 A | 7/2007 |
| JP | 2014/179338 A | 8/2014 |
| JP | 2015-28842 A | 2/2025 |
| KR | 10-0719725 B1 | 5/2007 |
| KR | 10-2007-0096649 A | 10/2007 |
| KR | 10-2015-0111723 A | 10/2015 |
| KR | 10-2017-0101653 A | 9/2017 |
| KR | 10-2017-0112250 A | 10/2017 |
| KR | 10-1873472 B1 | 7/2018 |
| KR | 10-2018-0094709 A | 8/2018 |

* cited by examiner

【FIG. 1】
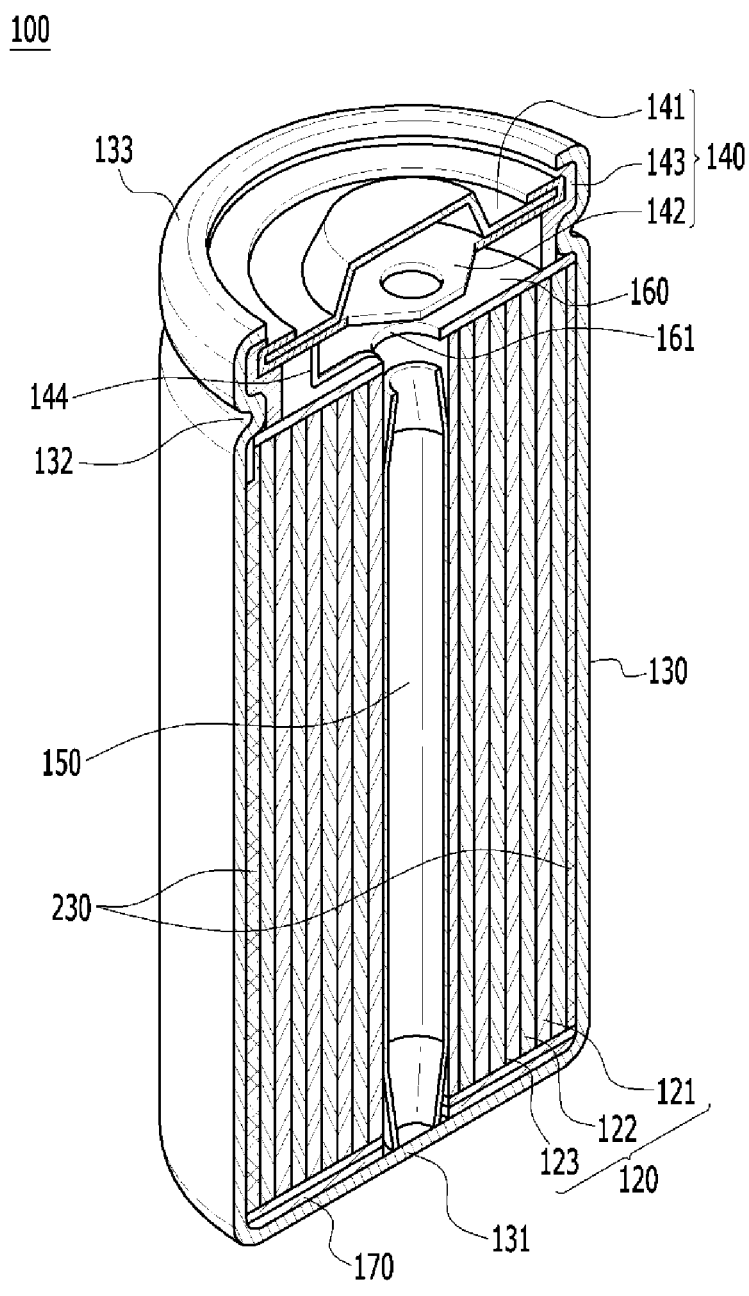

【FIG. 2】
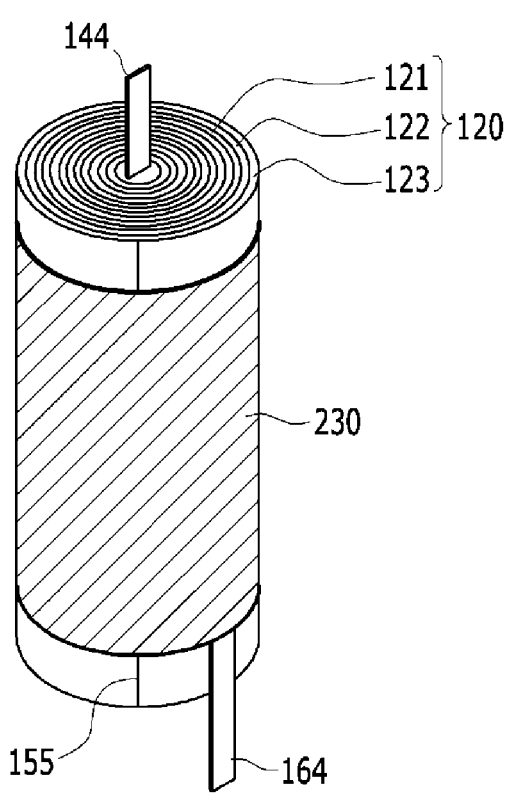

【FIG. 3】
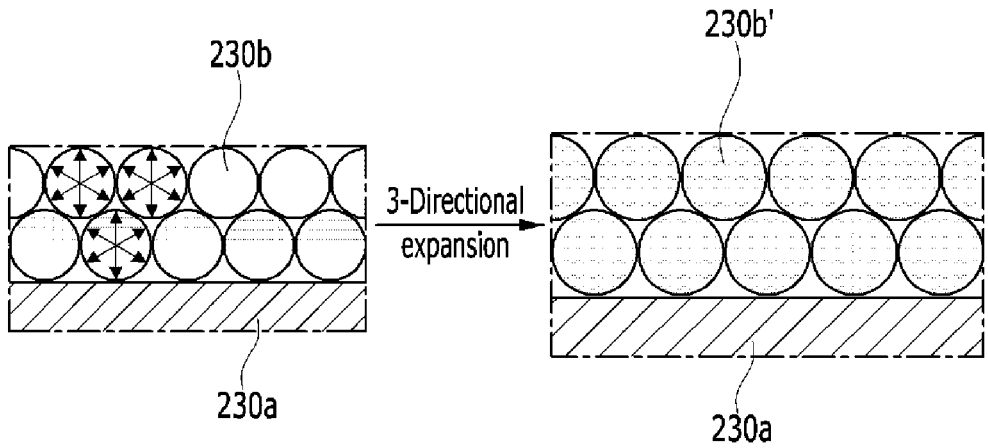
【FIG. 4】
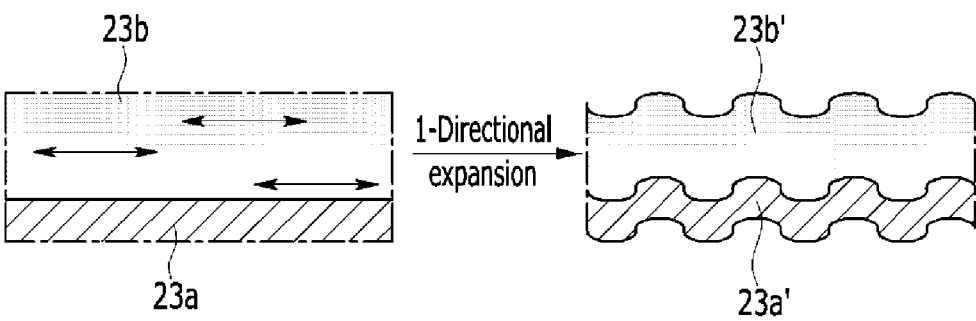

【FIG. 5】
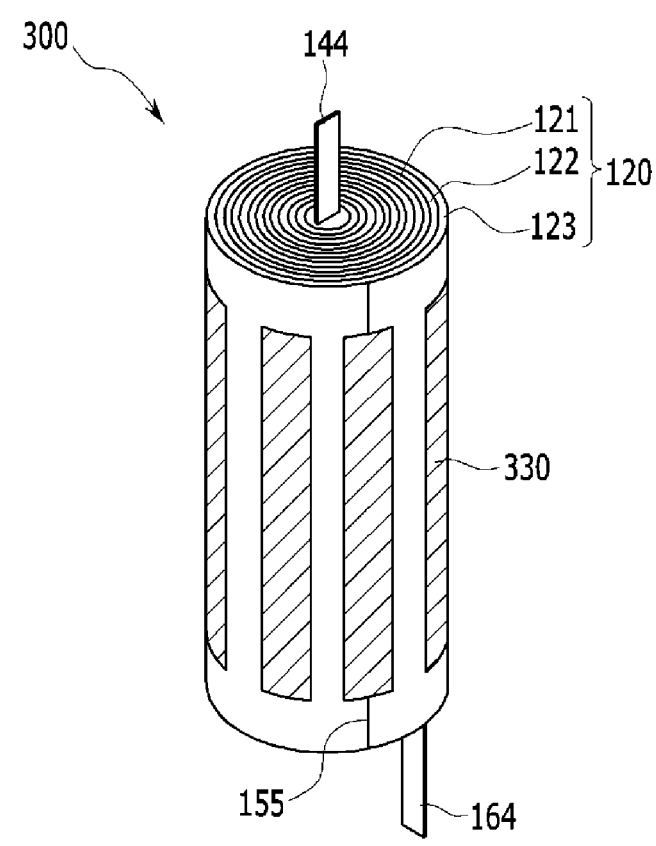

SECONDARY BATTERY AND BATTERY PACK INCLUDING THE SAME

CROSS CITATION WITH RELATED APPLICATION(S)

This application claims the benefit of Korean Patent Application No. 10-2020-0006802 filed on Jan. 17, 2020 with the Korean Intellectual Property Office, the disclosure of which is incorporated herein by reference in its entirety.

TECHNICAL FIELD

The present disclosure relates to a secondary battery and a battery pack including the same, and more particularly, to a secondary battery with improved stability against vibration and a battery pack including the same.

BACKGROUND ART

As the demands for portable electronic products such as notebooks, video cameras and cellular phones are rapidly increased in these days, and development of electric vehicles, energy storage batteries, robots, satellites, etc. is under active progress, numerous studies are being made on secondary batteries being used as the driving power source.

The electrode assembly mounted in the battery case is a power generating element, having a cathode/separator/anode stack structure, which can be charged and discharged, and the electrode assembly is classified into a jelly-roll type, a stacked type and a stacked/folded type. The jelly-roll type electrode assembly is configured to have a structure in which a long sheet type cathode and a long sheet type anode, to which active materials are applied, are wound in a state where a separator is interposed between the cathode and the anode, the a stacked type electrode assembly is configured to have a structure in which a plurality of cathodes having a predetermined size and a plurality of anodes having a predetermined size are sequentially stacked in a state in which separators are interposed between the cathodes and the anodes, and the stacked/folded type electrode assembly is a combination of the a jelly-roll type electrode assembly and the stacked type electrode assembly. Among them, the jelly-roll type electrode assembly has advantages in that manufacturing is easy and an energy density per unit mass is high.

Such a secondary battery includes, for example, nickel-cadmium battery, nickel hydrogen battery, nickel zinc battery, lithium secondary battery, and the like. Since the lithium secondary battery among them has the advantages in that it has almost no memory effect compared to nickel-based secondary battery, and thus, can be charged and discharged freely, and have very low self-discharge rate, high operating voltage, and high energy density per unit weight, it is widely used in the field of advanced electronic devices.

Based on the shape of a battery case, a secondary battery may be classified into a cylindrical battery where an electrode assembly is mounted in a cylindrical metal can, a prismatic battery where an electrode assembly is mounted in a prismatic metal can, or a pouch-shaped battery where an electrode assembly is mounted in a pouch-shaped case formed of an aluminum laminate sheet. Among them, the cylindrical battery has the advantages in that it has relatively large capacity and is structurally stable. However, when the cylindrical battery is used in the field of power tools, movement of the electrode assembly in the secondary battery occurs depending on the usage environment, and thus it may be difficult to secure the stability of the battery. When such an electrode assembly is exposed to vibration and shock without any special measures, damage may occur to the electrode assembly or internal components, which results in deterioration of performance.

Therefore, there is a need to develop a secondary battery that can maintain its performance even when exposed to strong vibration or shock.

DETAILED DESCRIPTION OF THE INVENTION

Technical Problem

It is an object of the present disclosure is to provide a secondary battery with improved stability against vibration and a battery pack including the same.

However, the problem to be solved by embodiments of the present disclosure is not limited to the above-described problems, and can be variously expanded within the scope of the technical idea included in the present disclosure.

Technical Solution

A secondary battery according to one embodiment of the present disclosure includes: an electrode assembly, a battery case surrounding the electrode assembly, and a sealing member located between the electrode assembly and the battery case, wherein the sealing member includes polymer particles that are expandable in all directions (e.g., swollen polymer particles).

The sealing member may include an adhesive layer and the polymer particles may be located on the adhesive layer.

The polymer particles may be configured to absorb an electrolyte solution to expand in all directions.

The adhesive layer may contact the electrode assembly.

The polymer particles may include a super absorbent polymer.

The polymer particles may be mixed with a polyurethane material or a polyacrylate material to form a film layer.

The film layer may be configured to expand in a surface direction of the adhesive layer and a direction perpendicular to the surface direction.

The sealing member may be configured to fill a gap between the electrode assembly and the battery case.

The sealing member may be provided as a plurality of sub-sealing members separated from each other.

The battery case may be cylindrical.

The secondary battery according to another embodiment of the present disclosure may include the above-mentioned battery secondary battery.

Advantageous Effects

According to the embodiments of the present disclosure, polymer particles which can absorb an electrolyte solution and expand in all directions can be formed into a film to fill a gap between the electrode assembly and the battery case of the secondary battery, thereby improving the battery stability against vibration.

BRIEF DESCRIPTION OF THE DRAWINGS

FIG. 1 is a cross-sectional perspective view of a secondary battery according to one embodiment of the present disclosure.

FIG. 2 is a perspective view illustrating a wound state of the electrode assembly of the secondary battery of FIG. 1.

FIG. 3 is a cross-sectional view illustrating a sealing member attached to the electrode assembly of the secondary battery of FIG. 2.

FIG. 4 is a cross-sectional view illustrating a sealing member according to a comparative example.

FIG. 5 is a perspective view illustrating a wound state of the electrode assembly of a secondary battery according to another exemplary embodiment of the present disclosure.

DETAILED DESCRIPTION OF THE EMBODIMENTS

Hereinafter, various embodiments of the present disclosure will be described in detail with reference to the accompanying drawings so that those skilled in the art can easily implement them. The present disclosure may be modified in various different ways, and is not limited to the embodiments set forth herein.

Portions that are irrelevant to the description will be omitted to clearly describe the present disclosure, and like reference numerals designate like elements throughout the specification.

Further, in the figures, the size and thickness of each element are arbitrarily illustrated for convenience of description, and the present disclosure is not necessarily limited to those illustrated in the figures. In the figures, the thickness of layers, regions, etc. are exaggerated for clarity. In the figures, for convenience of description, the thicknesses of some layers and regions are shown to be exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper end of the reference portion toward the opposite direction of gravity.

Further, throughout the specification, when a portion is referred to as "including" a certain component, it means that the portion can further include other components, without excluding the other components, unless otherwise stated.

Further, throughout the specification, when referred to as "planar", it means when a target portion is viewed from the upper side, and when referred to as "cross-sectional", it means when a target portion is viewed from the side of a cross section cut vertically.

FIG. 1 is a cross-sectional perspective view of a secondary battery 100 according to one embodiment of the present disclosure.

Referring to FIG. 1, the secondary battery 100 according to the present embodiment includes a jelly-roll type electrode assembly 120, a top insulator 160 located at the top of the electrode assembly 120 and a bottom insulator 170 located at the bottom of the electrode assembly 120.

The electrode assembly 120 has a jelly-roll type structure in which a cathode 121 and an anode 123 is wound with a separator 122 interposed therebetween, and a center pin 150 may be inserted in the central part thereof.

The secondary battery 100 according to the embodiment of the present disclosure can be formed by housing the electrode assembly 120 in a battery case 130, injecting an electrolyte solution into the battery case 130, and then connecting a cap assembly 140 to the top of the battery case 130. In this embodiment, the battery case 130 may be cylindrical.

At this time, the battery case 130 may include a beading part 132 and a crimping part 133. The beading part 132 refers to a part in which a part of the battery case 130 is recessed in the central direction of the electrode assembly 120, which is for stable coupling of the cap assembly 140 and preventing the flow of the electrode assembly 120. The crimping part 133 is located above the beading part 132 and refers to a part surrounding the cap assembly 140, which is for stable coupling of the cap assembly 140.

The cap assembly 140 may include a top cap 141 forming a cathode terminal, a cap plate 142 to which the cathode tab 144 extending upward from the electrode assembly 120 is connected, and an airtight gasket 143.

The gasket 143 is mounted on the upper inner surfaces of the crimping part 133 and the beading part 132, thereby increasing a sealing force between the cap assembly 140 and the battery case 130.

As described above, the cathode tab 144 may be extended upward from the electrode assembly 120. Specifically, it may be extended from the cathode 121 of the electrode assembly 120.

The cathode tab 144 is connected to a cap plate 142, so that a top cap 141 can operate as a cathode terminal. An opening 161 is formed in a top insulator 160, and the cathode tab 144 can pass through the opening 161 to be connected to the cap plate 142.

The center pin 150 generally includes a metallic material to impart a predetermined strength, and is formed in a cylindrical structure in which a plate material is bent into a round shape. In addition to self-heating, the center pin 150 can function as a passage for fixing and supporting the electrode assembly 120 and releasing gas generated by an internal reaction during charging/discharging and operation.

On the other hand, the electrolyte solution injected into the battery case 130 may be a lithium salt-containing non-aqueous electrolyte solution, and the lithium salt-containing non-aqueous electrolyte solution is composed of a non-aqueous electrolyte solution and a lithium salt. The non-aqueous electrolyte used herein includes a non-aqueous organic solvent, an organic solid electrolyte, an inorganic solid electrolyte, or the like, but is not limited thereto.

As examples of the non-aqueous electrolyte, mention may be made of non-protic organic solvents, such as N-methyl-2-pyrollidinone, propylene carbonate, ethylene carbonate, butylene carbonate, dimethyl carbonate, diethyl carbonate, gamma-butyro lactone, 1,2-dimethoxy ethane, tetrahydroxyfuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

Examples of the organic solid electrolyte include polyethylene derivatives, polyethylene oxide derivatives, polypropylene oxide derivatives, phosphoric acid ester polymers, polyalginate lysine, polyester sulfide, polyvinyl alcohols, polyvinylidene fluoride, and polymers containing ionic dissociation groups.

Examples of the inorganic solid electrolyte include nitrides, halides and sulfates of lithium (Li) such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, $Li_3PO_4$—$Li_2S$—$SiS_2$.

The lithium salt is a material that is readily soluble in the above-mentioned non-aqueous electrolyte. The lithium salt may include, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, and imide.

In addition, in order to improve charge/discharge characteristics and flame retardancy, the non-aqueous electrolyte may further include, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like. In some cases, in order to impart incombustibility, the electrolyte may further include halogen-containing solvents, such as carbon tetrachloride and ethylene trifluoride. Furthermore, in order to improve high-temperature retention characteristics, the electrolyte may further include carbon dioxide gas. In addition, it may further include fluoro-ethylene carbonate (FEC), propene sultone (PRS), and the like.

In one specific example, lithium salts such as $LiPF_6$, $LiClO_4$, $LiBF_4$ and $LiN(SO_2CF_3)_2$ are added to a mixed solvent of a cyclic carbonate of EC or PC as a highly dielectric solvent and a linear carbonate of DEC, DMC or EMC as a low-viscosity solvent to prepare a lithium salt-containing non-aqueous electrolyte.

FIG. 2 is a perspective view illustrating a wound state of the electrode assembly of the secondary battery of FIG. 1.

Referring to FIG. 2, the secondary battery according to one embodiment of the present disclosure includes a sealing member 230 that is located on an outer peripheral surface of an electrode assembly 120 including a cathode 121, an anode 123, and a separator 122. The sealing member 230 is located between the electrode assembly 120 and the battery case 130. The sealing member 230 according to the present embodiment includes swollen polymer particles that expand in all directions.

The sealing member 230 in FIG. 2 is illustrated in a form that is located separately from the top and bottom of the outer peripheral surface of the electrode assembly 120, but this is for convenience of description, and may be located so as to surround the entire outer peripheral surface of the electrode assembly 120.

The electrode assembly 120 may have electrode tabs 144 and 164 that are located between at least a part of the sealing member 230 and an outer peripheral surface of the electrode assembly 120.

The electrode tabs 144 and 164 include an anode tab 164 attached to an anode 123 and a cathode tab 144 attached to a cathode 121. In FIG. 2, the anode tab 164 is attached to the outer peripheral surface of the electrode assembly 120 so that the anode tab 164 is located between at least a part of the sealing member 230 and the outer peripheral surface of the electrode assembly 120, and the cathode tab 144 is shown to be located at the central part of the electrode assembly 120. However, it goes without saying that the cathode tab 144 may be attached to the outer peripheral surface of the electrode assembly 120 and the anode tab 164 may be located at the central part of the electrode assembly

120. In addition, although not illustrated, one or more cathode tabs and anode tabs may be additionally attached for a high-power model.

At least a part of the sealing member 230 may be adhered to a finishing part 155 of the outer peripheral surface of the electrode assembly 120, and the finishing part 155 may be located at the outermost end of the separator 122. Since at least a part of the sealing member 230 is pressed against the electrode assembly 120 while covering the finishing part 155, the wound state of the electrode assembly 120 can be maintained, and a phenomenon in which the electrode assembly 120 is unwound due to internal stress can be prevented.

FIG. 3 is a cross-sectional view illustrating a sealing member attached to the electrode assembly of the secondary battery of FIG. 2.

Referring to FIGS. 2 and 3, the sealing member 230 according to the present embodiment may form a structure in which swollen polymer particles 230*b* are applied onto an adhesive layer 230*a* to form a film layer. The lower surface of the adhesive layer 230*a* may come into contact with the electrode assembly 120. At this time, the swollen polymer particles 230*b* may expand in multiple directions when the electrolyte solution is absorbed. Specifically, the swollen polymer particles 230*b* not only expand in the horizontal and vertical directions on the basis of a surface parallel to the adhesive layer 230*a*, but also can expand in a direction perpendicular to the adhesive layer 230*a*. Accordingly, as shown on the right side of FIG. 3, it is possible to show a state in which the swollen polymer particles 230*b*' are relatively expanded.

As described above, since the sealing member 230 according to the present embodiment absorbs the electrolyte solution and expands in multiple directions, the gap between the electrode assembly 120 and the battery case 130 of FIG. 1 can be evenly filled, so that the secondary battery can improving the stability against vibration.

The sealing member 230 according to the present embodiment may be formed by applying swollen polymer particles 230*b* onto the adhesive layer 230*a*. The swollen polymer particles 230*b* may be a super absorbent polymer (SAP).

In a modified embodiment, the sealing member 230 may be formed through the following steps.

First, the polymer resin monomer and the swollen polymer particles are mixed and polymerized, and then a polymer resin film containing the swollen polymer particles is formed. The polymer resin may be composed of an aromatic isocyanate compound, a polyol compound, an acrylic-based compound, or a fluorine-based compound that are not reactive with the electrolyte solution. The polymerization of the resin may be the same as a polyurethane, acrylate polymerization, polyvinylidene-fluoride (PVDF) polymerization method, or the like. Thereafter, an acrylic-based adhesive is applied onto a polymer film containing swollen polymer particles to prepare a swelling tape.

As such, the swollen polymer particles 230*b* can be applied onto the adhesive layer 230*a* in a state of being mixed with other polymer materials such as polyurethane and polyacrylate, thereby forming a film layer. When the swollen polymer particles 230*b* are mixed with other polymer materials such as polyurethane to form a film layer in this way, the miscibility between the swollen polymer particles and the polymer material matrix is excellent, so that a film can be stably formed. Since the matrix swells in the surface direction and the swollen polymer particles are swellable in all directions, the swelling effect can be maximized. Further, according to a modified embodiment, by simply applying the swollen polymer particles onto the adhesive layer, it is possible to prevent the swollen polymer particles from being separated from the sealing member due to the electrolyte solution after the battery cell is assembled.

FIG. 4 is a cross-sectional view illustrating a sealing member according to a comparative example.

Referring to FIG. 4, when the sealing member 230 is formed with a structure in which a polymer film 23*b* is attached on the adhesive layer 23*a*, it expands only in the direction of one side, which is a surface parallel to the adhesive layer 230*a*, so that an adhesive layer 23*a*' having wrinkles and a polymer film 23*b*' are formed. Since the gap between the electrode assembly and the battery case is filled by the winkled structure, it is difficult to securely fix the electrode assembly. For example, the polymer film 23*b* according to the comparative example may be formed of any one of a polymer material containing an ester group or a carboxyl group, polyvinyldifluoride, polybutadiene, and polyisoprene.

FIG. 5 is a perspective view illustrating a wound state of the electrode assembly of a secondary battery according to another exemplary embodiment of the present disclosure. Since the embodiment of FIG. 5 is almost the same as the embodiment described with reference to FIG. 2, only the parts having differences will be described below.

Referring to FIG. 5, the sealing members 330 according to the present embodiment are separated from each other at regular intervals and are attached to the outer peripheral surface of the electrode assembly 120. Specifically, the sealing member 330 is made of a plurality of sub-sealing members separated from each other, and the sub-sealing member may be attached to a certain area of the electrode assembly 120 to cover the closing part 155. The front surface of the sub-sealing member can be formed into a square shape. Preferably, it may be formed in a vertically long rectangular shape to achieve a uniform shape.

Except for the differences described above, the contents described in FIG. 2 are applicable to all of the present embodiment.

The secondary battery according to the present exemplary embodiment described above may be mounted on one or more frames to form a battery pack. The secondary battery or battery pack described above can be applied to various devices. These devices may be applied to transportation means such as an electric bicycle, an electric vehicle, a hybrid vehicle, but the present disclosure is not limited thereto and can be applied to various devices that can use the battery module or the battery pack including the same.

Although the preferred embodiments of the present disclosure have been described in detail above, the scope of the present disclosure is not limited thereto, and various modifications and improvements of those skilled in the art using the basic concepts of the present disclosure defined in the following claims also belong to the scope of rights.

DESCRIPTION OF REFERENCE NUMERALS

100: secondary battery
120: electrode assembly
230: sealing member
144: cathode
164: anode
230*a*: adhesive layer
230*b*: swollen polymer particles

The invention claimed is:

1. A secondary battery comprising:
an electrode assembly,
a battery case surrounding the electrode assembly, and
a sealing member located between the electrode assembly and the battery case,
wherein the sealing member includes polymer particles that are expandable in all directions,
wherein the polymer particles include a super absorbent polymer,
wherein the battery case comprises a non-aqueous electrode solution, and the super absorbent polymer is configured to absorb the non-aqueous electrolyte solution to expand in all directions.

2. The secondary battery according to claim 1, wherein the sealing member includes an adhesive layer, and
wherein the polymer particles are located on the adhesive layer.

3. The secondary battery according to claim 2, wherein the adhesive layer contacts the electrode assembly.

4. The secondary battery according to claim 2, wherein the polymer particles are mixed with a polyurethane material or a polyacrylate material to form a film layer.

5. The secondary battery according to claim 4, wherein the film layer is configured to expand in a surface direction of the adhesive layer and a direction perpendicular to the surface direction.

6. The secondary battery according to claim 1, wherein the sealing member is configured to fill a gap between the electrode assembly and the battery case.

7. The secondary battery according to claim 1, wherein the sealing member is provided as a plurality of sub-sealing members separated from each other.

8. The secondary battery according to claim 1, wherein the battery case is cylindrical.

9. A battery pack comprising the secondary battery according to claim 1.

10. The secondary battery according to claim 1, wherein the polymer particles comprise expanded polymer particles that are expanded in the directions.

11. The secondary battery according to claim 1, wherein the polymer particles are configured to expand in the directions in a state of the sealing member being disposed between the electrode assembly and the battery case and exposed to an electrolyte.

12. The secondary battery according to claim 1, wherein the polymer particles comprise expanded polymer particles that are formed by expanding polymer particles in the directions.

13. The secondary battery according to claim 1, wherein the super absorbent polymer is a non-hydrated super absorbent polymer.

14. The secondary battery according to claim 1, wherein the super absorbent polymer comprises swollen super absorbent polymer particles absorbed with non-aqueous electrolyte solution, and
wherein the sealing member comprises a stable film layer comprising the swollen super absorbent polymer particles and a polymer material matrix comprising a polyurethane material or a polyacrylate material.

15. A secondary battery comprising:
an electrode assembly,
a battery case surrounding the electrode assembly, and
a sealing member located between the electrode assembly and the battery case,
wherein the sealing member includes polymer particles that are expandable in all directions, wherein the polymer particles include a super absorbent polymer, and wherein the super absorbent polymer is a non-hydrated super absorbent polymer.

16. A secondary battery comprising:

an electrode assembly, a battery case surrounding the electrode assembly, and a sealing member located between the electrode assembly and the battery case, wherein the sealing member includes polymer particles that are expandable in all directions, wherein the polymer particles include a super absorbent polymer, wherein the super absorbent polymer comprises swollen super absorbent polymer particles absorbed with non-aqueous electrolyte solution, and wherein the sealing member comprises a stable film layer comprising the swollen super absorbent polymer particles and a polymer material matrix comprising a polyurethane material or a polyacrylate material.

* * * * *